United States Patent
Li

(10) Patent No.: US 7,734,107 B2
(45) Date of Patent: Jun. 8, 2010

(54) SYSTEM AND METHOD FOR PERFORMING WAVELET-BASED TEXTURE FEATURE EXTRACTION AND CLASSIFICATION

(75) Inventor: Pingshan Li, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1138 days.

(21) Appl. No.: 11/362,215

(22) Filed: Feb. 24, 2006

(65) Prior Publication Data

US 2007/0201754 A1 Aug. 30, 2007

(51) Int. Cl.
*G06K 9/46* (2006.01)
(52) U.S. Cl. .................. 382/240; 382/164; 382/167; 382/224; 382/209; 382/305; 358/518; 358/1.9
(58) Field of Classification Search .......... 382/164, 382/165, 167, 224, 209, 240, 305, 274; 358/518, 358/1.9
See application file for complete search history.

(56) References Cited

U.S. PATENT DOCUMENTS

| | | | |
|---|---|---|---|
| 5,913,205 A * | 6/1999 | Jain et al. ................ 707/2 |
| 6,078,688 A * | 6/2000 | Cox et al. ................ 382/173 |
| 6,084,595 A | 7/2000 | Bach et al. |
| 6,549,674 B1 * | 4/2003 | Chui et al. ................ 382/240 |
| 6,556,853 B1 | 4/2003 | Cabib et al. |
| 6,751,320 B2 | 6/2004 | Rhoads |
| 6,804,683 B1 * | 10/2004 | Matsuzaki et al. ........ 707/104.1 |
| 7,194,127 B2 * | 3/2007 | Brechner ................ 382/165 |
| 2001/0016008 A1 | 8/2001 | Bahl et al. |
| 2003/0052875 A1 | 3/2003 | Salomie |
| 2005/0021512 A1 * | 1/2005 | Koenig ................ 707/3 |
| 2006/0048191 A1 * | 3/2006 | Xiong ................ 725/52 |
| 2007/0070365 A1 * | 3/2007 | Boregowda et al. ........ 358/1.9 |

\* cited by examiner

*Primary Examiner*—Samir A Ahmed
*Assistant Examiner*—Ali Bayat
(74) *Attorney, Agent, or Firm*—Gregory J. Koerner; Redwood Patent Law

(57) ABSTRACT

A system and method are disclosed for performing wavelet-based local texture feature extraction and classification procedures. Image data is initially provided to include a query image and a series of test images. A feature detector calculates image parameters corresponding to the image data. The image parameters include mean absolute values, variance values, and texture angles. The feature detector utilizes the image parameters to calculate distance values that represent texture similarity characteristics between the query image and each of the test images. The feature detector then evaluates the distance values to determine one or more matching images from among the test images.

11 Claims, 9 Drawing Sheets

SYSTEM AND METHOD FOR PERFORMING WAVELET-BASED TEXTURE FEATURE EXTRACTION AND CLASSIFICATION

BACKGROUND SECTION

1. Field of the Invention

This invention relates generally to techniques for analyzing information, and relates more particularly to a system and method for performing wavelet-based texture feature extraction and classification procedures.

2. Description of the Background Art

Implementing effective methods for analyzing information is a significant consideration for designers and manufacturers of contemporary electronic devices. However, effectively analyzing information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes and manipulates digital image data may benefit from an efficient implementation because of the large amount and complexity of the digital data involved.

Due to growing demands on system resources and substantially increasing data magnitudes, it is apparent that developing new techniques for analyzing information is a matter of concern for related electronic technologies. Therefore, for all the foregoing reasons, developing effective systems for analyzing information remains a significant consideration for designers, manufacturers, and users of contemporary electronic devices.

SUMMARY

In accordance with the present invention, a system and method are disclosed for performing wavelet-based texture feature extraction and classification procedures. In one embodiment, a computer device selects a query image for performing an image retrieval procedure to identify matching test images from stored image data. Then, a feature detector calculates wavelet coefficients corresponding to a four-level Haar wavelet transform of the query image.

Next, the feature detector calculates coefficient mean absolute values and coefficient variance values for each subband of the four-level wavelet transform, based upon the foregoing wavelet coefficients. The feature detector then utilizes the coefficient mean absolute values and coefficient variance values to calculate mean absolute value texture angles and variance value texture angles for each wavelet level of the wavelet transform. The feature detector also calculates total mean absolute values and total variance values from the corresponding coefficient mean absolute values and coefficient variance values.

In accordance with the present invention, the feature detector advantageously utilizes the foregoing texture angles, total mean absolute values, and total variance values to calculate distance values that represent texture similarity characteristics between the query image and various test images. Finally, the feature detector concludes the image retrieval procedure by evaluating the calculated distance values to identify one or more matching images from the test images.

In certain embodiments, the present invention may be similarly utilized for performing image retrieval procedures to match one or more test images to a selected image model. For at least the foregoing reasons, the present invention therefore provides an improved system and method for performing wavelet-based texture feature extraction and classification procedures.

DETAILED DESCRIPTION

The present invention relates to an improvement in information analysis techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for performing wavelet-based local texture feature extraction and classification procedures. Image data is initially provided to include a query image and a series of test images. A feature detector calculates various appropriate image parameters corresponding to the image data. The image parameters include mean absolute values, variance values, and texture angles. The feature detector utilizes the image parameters to calculate distance values that represent texture similarity characteristics between the query image and each of the test images. The feature detector may then evaluate the distance values to determine one or more matching images from among the test images.

Figure 1:
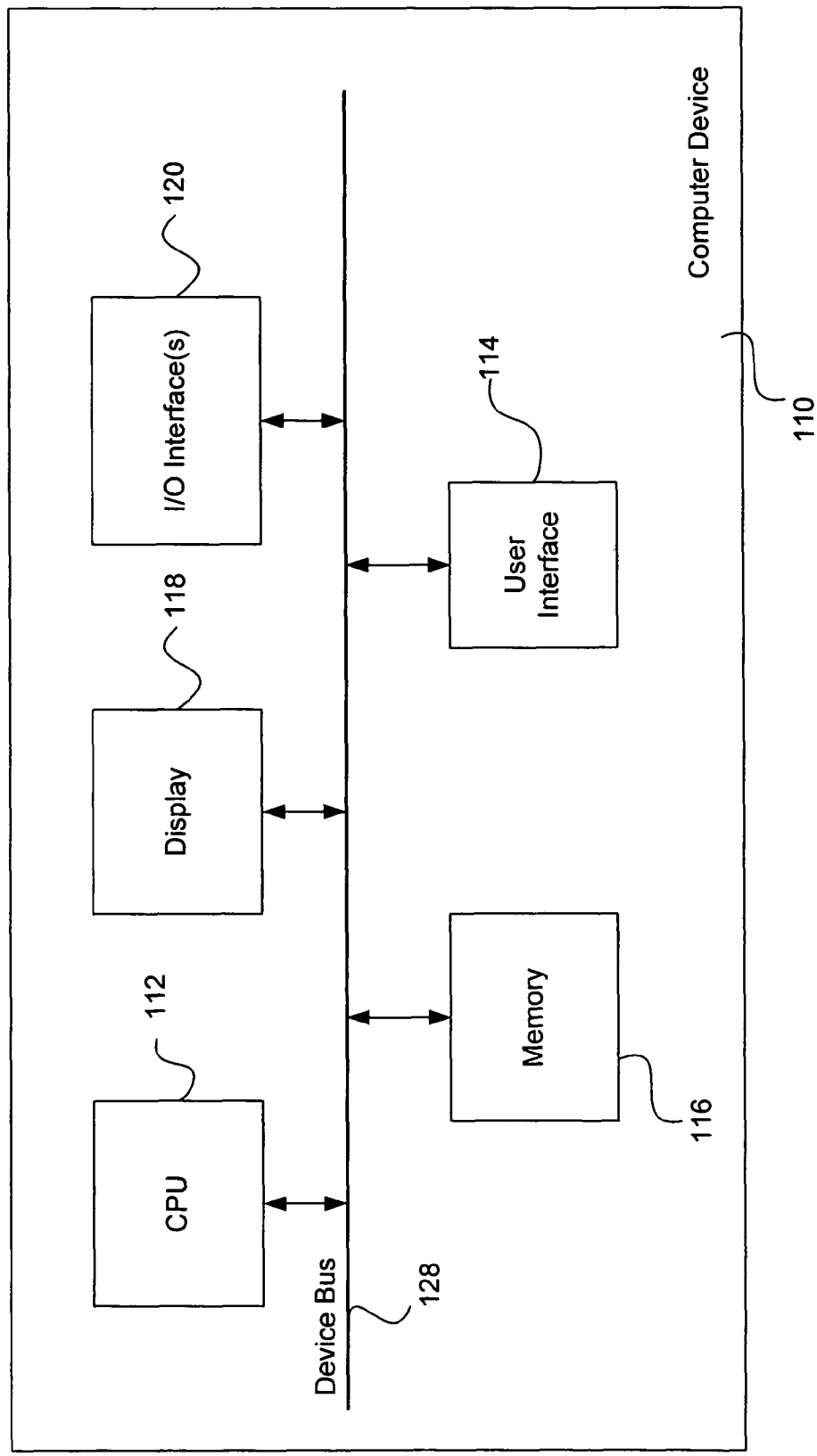
FIG. 1 is a block diagram for one embodiment of a computer device, in accordance with the present invention.

Referring now to FIG. 1, a block diagram for one embodiment of a computer device 110 is shown, in accordance with the present invention. In the FIG. 1 embodiment, computer device 110 includes, but is not limited to, a central processing unit (CPU) 112, a user interface 114, memory 116, a display 118, and input/output interface(s) (I/O interface(s)) 120. The foregoing components of computer device 110 may preferably be coupled to, and communicate through, a device bus 128.

In alternate embodiments, computer device 110 may be implemented using components and configurations in addition to, or instead of, certain of those components and configurations discussed in conjunction with the FIG. 1 embodiment. Furthermore, the present invention may readily be performed by various types of electronic devices other than computer device 110.

In the FIG. 1 embodiment, CPU 112 may be implemented to include any appropriate and compatible microprocessor device that preferably executes software instructions to control and manage the operation of image manager 110. The FIG. 1 display 118 may include any effective type of display technology including a cathode-ray-tube monitor or a liquid-crystal display device. In the FIG. 1 embodiment, I/O interface(s) 120 may include one or more input and/or output interfaces to receive and/or transmit any required types of relevant information by computer device 110.

In the FIG. 1 embodiment, memory 116 may include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIG. 2 and FIG. 3.

Figure 2:
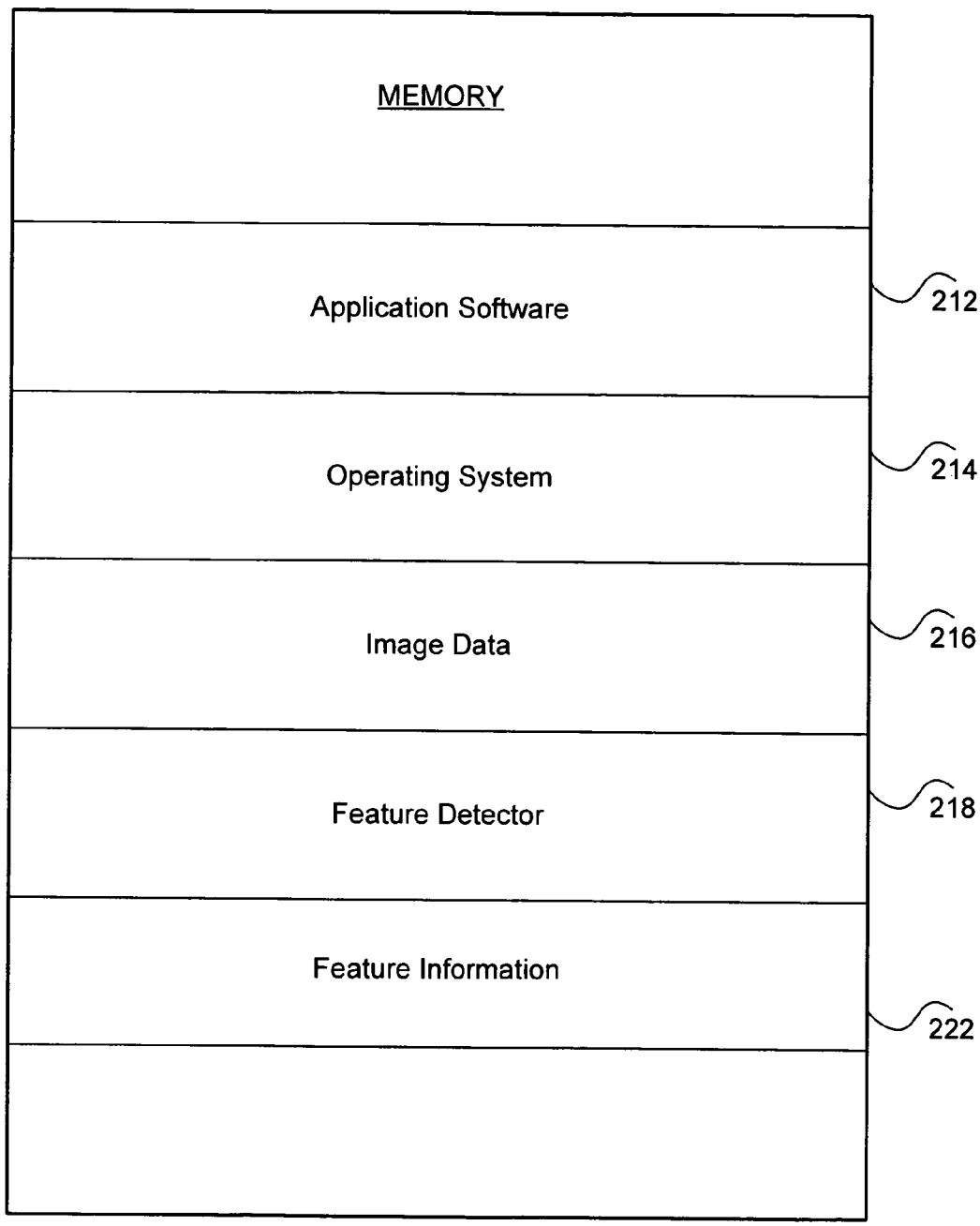
FIG. 2 is a block diagram for one embodiment of the memory of FIG. 1, in accordance with the present invention.

Referring now to FIG. 2, a block diagram for one embodiment of the FIG. 1 memory 116 is shown, in accordance with the present invention. In the FIG. 2 embodiment, memory 116 includes, but is not limited to, application software 212, an operating system 214, image data 216, feature detector 218, and feature information 222. In alternate embodiments, memory 116 may include other components in addition to, or instead of, certain of those components discussed in conjunction with the FIG. 2 embodiment.

In the FIG. 2 embodiment, application software 212 may include program instructions that are executed by CPU 112 (FIG. 1) to perform various functions and operations for computer device 110. The particular nature and functionality of application software 212 may vary depending upon factors such as the specific type and particular use of the corresponding computer device 110. In the FIG. 2 embodiment, operating system 214 controls and coordinates low-level functionality of computer device 110.

Image data 216 includes various types of image information that is stored in memory 116. Image data 216 may include captured image data or other types of image information. For example, in certain embodiments, image data 216 may include one or more images that a system user obtains from an external source such as a camera device or the Internet. In alternate embodiments, the present invention may readily be utilized to analyze data other than the image data 216 shown in FIG. 2.

In the FIG. 2 embodiment, feature detector 218 may be utilized to create and analyze feature information 222 to thereby perform image search procedures. One embodiment for feature information 222 is further discussed below in conjunction with FIG. 3. Furthermore, the utilization of feature detector 218 to generate and utilize feature information 222 is further discussed below in conjunction with FIGS. 4-9.

Figure 3:
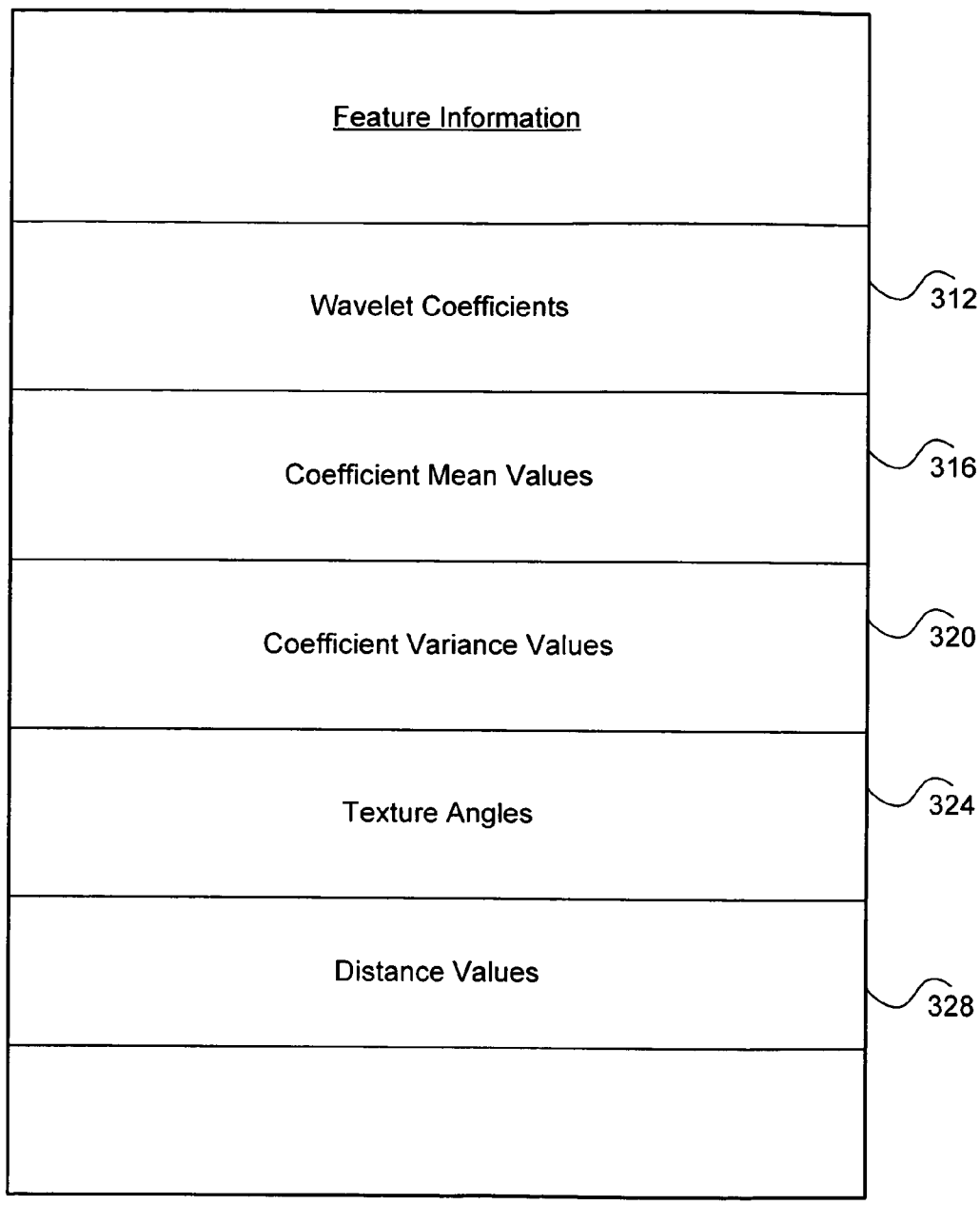
FIG. 3 is a block diagram for one embodiment of the feature information of FIG. 2, in accordance with the present invention.

Referring now to FIG. 3, a block diagram for one embodiment of the FIG. 2 feature information 222 is shown, in accordance with the present invention. In the FIG. 3 embodiment, feature information 222 may include, but is not limited to, wavelet coefficients 312, coefficient mean absolute values 316, coefficient variance values 320, texture angles 324, and distance values 328. In alternate embodiments, feature information 222 may readily include other components in addition to, or instead of, certain of those components discussed in conjunction with the FIG. 3 embodiment. In the FIG. 3 embodiment, certain elements and parameters of feature information 222 may be calculated when image data 216 is initially received by computer device 110. Generation and utilization of feature information 222 by feature detector 218 is further discussed below in conjunction with FIGS. 4-9.

Figure 4:
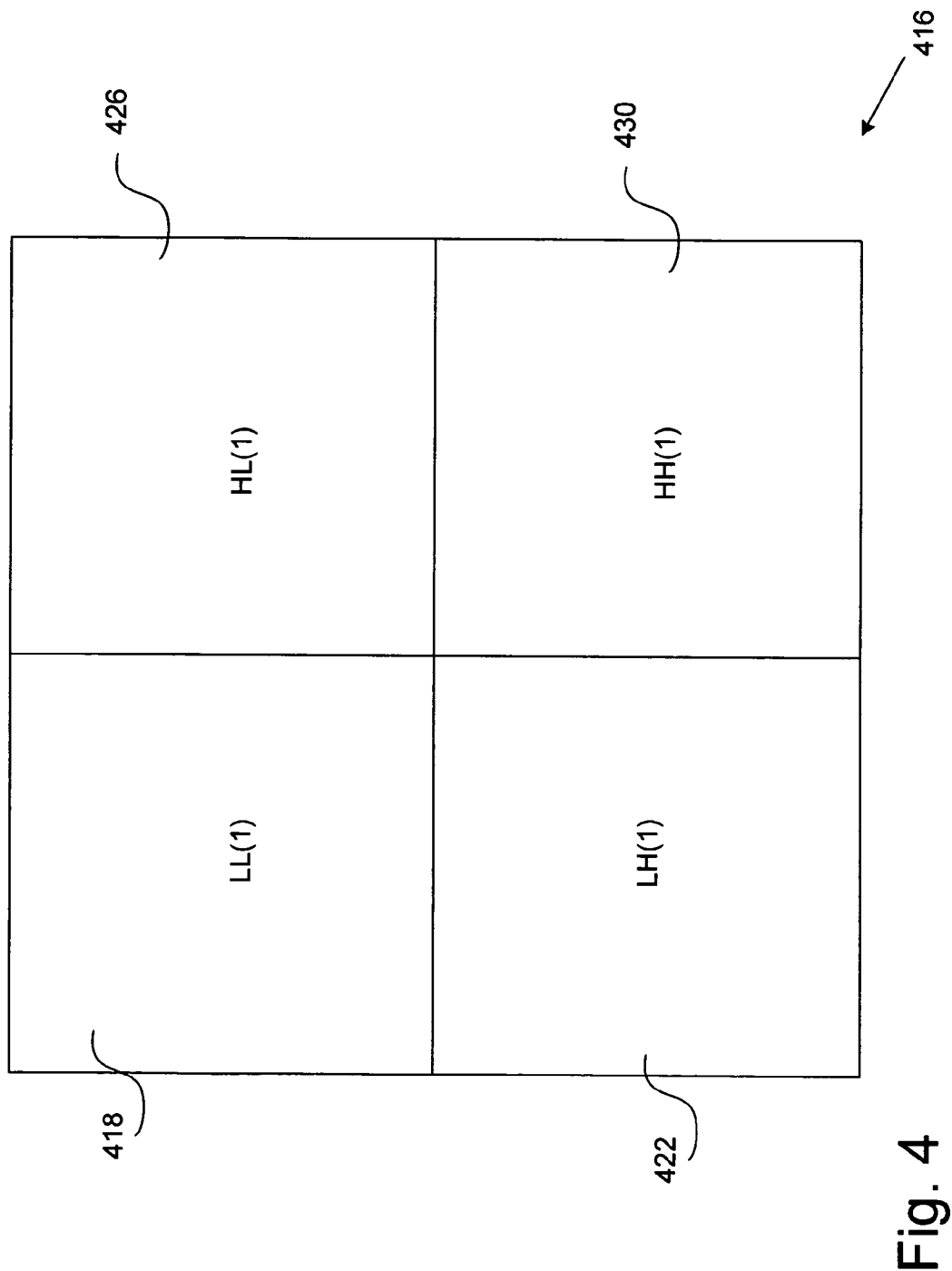
FIG. 4 is a diagram illustrating a first level of a Haar wavelet transform, in accordance with one embodiment of the present invention.

Referring now to FIG. 4, a diagram illustrating a first level 416 of a Haar wavelet transform is shown, in accordance with one embodiment of the present invention. The FIG. 4 embodiment is presented for purposes of illustration, and in alternate embodiments, the present invention may readily include various other techniques and elements, in addition to, or instead of, those techniques and elements discussed in conjunction with the FIG. 4 embodiment. In the FIG. 4 example, the Haar transform is typically performed upon luminance information from a given image.

In the FIG. 4 example, first level 416 represents a given set of wavelet coefficients 312 (FIG. 3) that includes a Low-Low subband (LL) 418, a Low-High subband (LH) 422, a High-Low subband 426, and a High-High subband (HH) 430. To generate first level 416 using the Haar transform procedure, horizontal rows of pixel values are initially divided into low-frequency portions corresponding to LL subband 418 and LH subband 422, and into high-frequency portions corresponding to HL subband 426 and HH subband 430. Initial low-frequency coefficients may then be calculated by feature detector 218 (FIG. 2) or other appropriate entity by combining adjacent pixel values according to the following formula:

$$L_i = (P_{2i} + P_{2i+1})\frac{1}{\sqrt{2}}$$

where L is a low-frequency wavelet coefficient, i is an index number of the wavelet coefficient, and P is a pixel value from the image data.

Initial high-frequency coefficients may also then be calculated by feature detector 218 (FIG. 2) or other appropriate entity by subtracting adjacent pixel values according to the following formula:

$$H_i = (P_{2i} - P_{2i+1})\frac{1}{\sqrt{2}}$$

where H is a high-frequency wavelet coefficient, i is an index number of the wavelet coefficient, and P is a pixel value from the image data.

Vertical columns of the foregoing initial low-frequency coefficients may then be divided into low-frequency portions (LL subband 418 and HL subband 426) and high-frequency subbands (LH subband 422 and HH subband 430). Final level-one wavelet coefficients 312 (FIG. 3) may then be calculated for LL subband 418 and HL subband 426 by combining adjacent initial wavelet coefficients, as discussed above. Final level-one wavelet coefficients 312 may also be calculated for LH subband 422 and HH subband 430 by feature detector 218 (FIG. 2) or other appropriate entity by subtracting adjacent initial wavelet coefficients, as discussed above.

Further discussion of various techniques for performing and utilizing Haar transforms may be found in "A Theory for Multiresolution Signal Decomposition: The Wavelet Representation," by S. G. Mallat, IEEE Transactions on Pattern Analysis and Machine Intelligence, Vol. 11, No. 7, pp. 674-693, July 1989.

Figure 5:
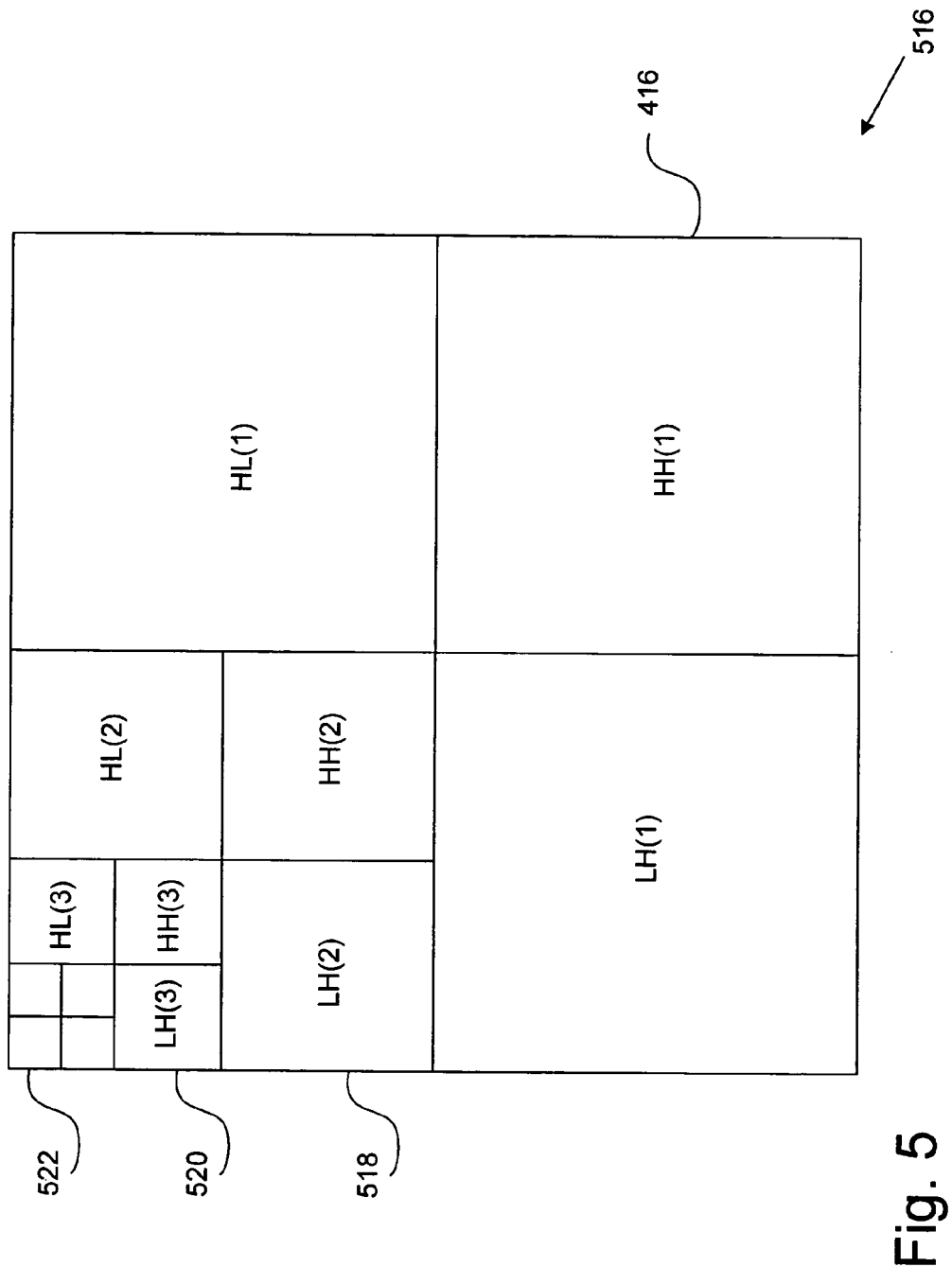
FIG. 5 is a diagram illustrating four levels of a Haar wavelet transform, in accordance with one embodiment of the present invention.

Referring now to FIG. 5, a diagram illustrating four levels 516 of a Haar wavelet transform is shown, in accordance with one embodiment of the present invention. The FIG. 5 embodiment is presented for purposes of illustration, and in alternate embodiments, the present invention may readily include various other techniques and elements, in addition to, or instead of, those techniques and elements discussed in conjunction with the FIG. 5 embodiment. For example, in other embodiments, a different number of transform levels may be utilized to generate wavelet coefficients 312 (FIG. 3).

In the FIG. 5 embodiment, three subbands (LH, HL, and HH) are shown from the first-level 416 discussed above in conjunction with FIG. 4. In the FIG. 5 embodiment, the fourth subband (LL 418) of FIG. 4 is utilized to calculate wavelet coefficients 312 for a second level 518 of the Haar transform by performing procedures similar to those discussed above in conjunction with FIG. 4. Similarly, the fourth subband (LL) of the second level 518 is utilized to calculate wavelet coefficients 312 for a third level 520 of the Haar transform, and the fourth subband (LL) of the third level 520 is utilized to calculate wavelet coefficients 312 for a fourth level 522 of the Haar transform.

In certain embodiments, feature detector 218 (FIG. 2) or other appropriate entity may then utilize the wavelet coefficients 312 (FIG. 3) from the foregoing four levels 516 of the FIG. 5 wavelet transform to calculate certain image parameters that are stored as feature information 222 (FIG. 3). In certain embodiments, one type of image parameter may be coefficient mean absolute values 316 (FIG. 3). Feature detector 218 (FIG. 2) or other appropriate entity may calculate coefficient mean absolute values 316 for the various subbands of the four levels 516 shown in FIG. 5.

For example, in certain embodiments, feature detector 218 (FIG. 2) or other appropriate entity may calculate a coefficient mean absolute value µ for a given subband LH by utilizing the following formula:

$$\mu_{LH(i)} = \frac{1}{MN} \sum_{m=1}^{M} \sum_{n=1}^{N} |W_{LH(i)}[m, n]|$$

where LH(i) is an LH subband at level i, W is a wavelet coefficient, m is a coefficient row, n is a coefficient column, M is equal to a total number of coefficient rows, and N is equal to a total number of coefficient columns. Coefficient mean absolute values 316 for other subbands may be calculated in a similar manner.

In addition, in certain embodiments, another type of image parameter may be coefficient variance values 320 (FIG. 3). Feature detector 218 or other appropriate entity may calculate coefficient variance values 320 for the various subbands of the four levels 516 shown in FIG. 5. For example, in certain embodiments, feature detector 218 or other appropriate entity may calculate a coefficient variance value σ for a given subband LH by utilizing the following formula:

$$\sigma^2_{LH(i)} = \frac{1}{MN} \sum_{m=1}^{M} \sum_{n=1}^{N} (|W_{LH(i)}[m, n]| - \mu_{LH(i)})^2$$

where LH(i) is an LH subband at level i, W is a wavelet coefficient, m is a coefficient row, n is a coefficient column, M is equal to a total number of coefficient rows, N is equal to a total number of coefficient columns, and µ is a corresponding coefficient mean absolute value 316. Coefficient variance values 320 for other subbands may be calculated in a similar manner.

In certain embodiments of the present invention, feature detector 218 or other appropriate entity may utilize the foregoing coefficient mean absolute values 316 and coefficient variance values 320 to calculate corresponding texture angles 324 (FIG. 3) that indicate how texture is oriented in a particular image. For example, in the FIG. 5 embodiment, a mean absolute value texture angle may be calculated according to the following formula:

$$\theta_{\mu(i)} = \arctan \frac{\mu_{LH(i)}}{\mu_{HL(i)}}$$

where $\theta_{\mu(i)}$ is a mean absolute value texture angle, µ is a coefficient mean absolute value 316, i is a subband level, LH is a Low-High subband 422 (FIG. 4), and HL is a High-Low subband 426 (FIG. 4). Similarly, in the FIG. 5 embodiment, a variance value texture angle may be calculated according to the following formula:

$$\theta_{\sigma(i)} = \arctan \frac{\sigma_{LH(i)}}{\sigma_{HL(i)}}$$

where $\theta_{\sigma(i)}$ is the variance value texture angle, σ is a coefficient variance value, i is a subband level, LH is a Low-High subband 422 (FIG. 4), and HL is a High-Low subband 426 (FIG. 4).

In certain embodiments, feature detector 218 or other appropriate entity may utilize the foregoing coefficient mean absolute values 316 and coefficient variance values 320 for each subband of each wavelet level to calculate total mean absolute values and total variance values for each wavelet level. For example, in the FIG. 5 embodiment, feature detector 218 or other appropriate entity may calculate total mean absolute values according to the following formula:

$$\mu_{(i)} = [\mu^2_{LH(i)} + \mu^2_{HH(i)} + \mu^2_{HL(i)}]^{1/2}$$

where $\mu_{(i)}$ is a total mean absolute value, i is a wavelet level, $\mu_{LH(i)}$ is a coefficient mean absolute value 316 for an LH subband 422 (FIG. 4), $\mu_{HH(i)}$ is a coefficient mean absolute value 316 for an HH subband 430 (FIG. 4), and $\mu_{HL(i)}$ is a coefficient mean absolute value 316 for an HL subband 426 (FIG. 4).

Similarly, in the FIG. 5 embodiment, feature detector 218 or other appropriate entity may calculate total variance values according to the following formula:

$$\sigma^2_{(i)} = \sigma^2_{LH(i)} + \sigma^2_{HH(i)} + \sigma^2_{HL(i)}$$

where $\sigma_{(i)}$ is a total variance value, i is a wavelet level, $\sigma_{LH(i)}$ is a coefficient variance value 320 for an LH subband 422

(FIG. 4), $\sigma_{HH(i)}$ is a coefficient variance value 320 for an HH subband 430 (FIG. 4), and $\sigma_{HL(i)}$ is a coefficient variance value 320 for an HL subband 426 (FIG. 4).

In certain embodiments, feature detector 218 or other appropriate entity may then utilize the foregoing parameter values to calculate distance values 328 (FIG. 3) to identify matching test images in image data 216 (FIG. 2). One technique for calculating distance values 328 is further discussed below in conjunction with FIG. 6.

Figure 6:
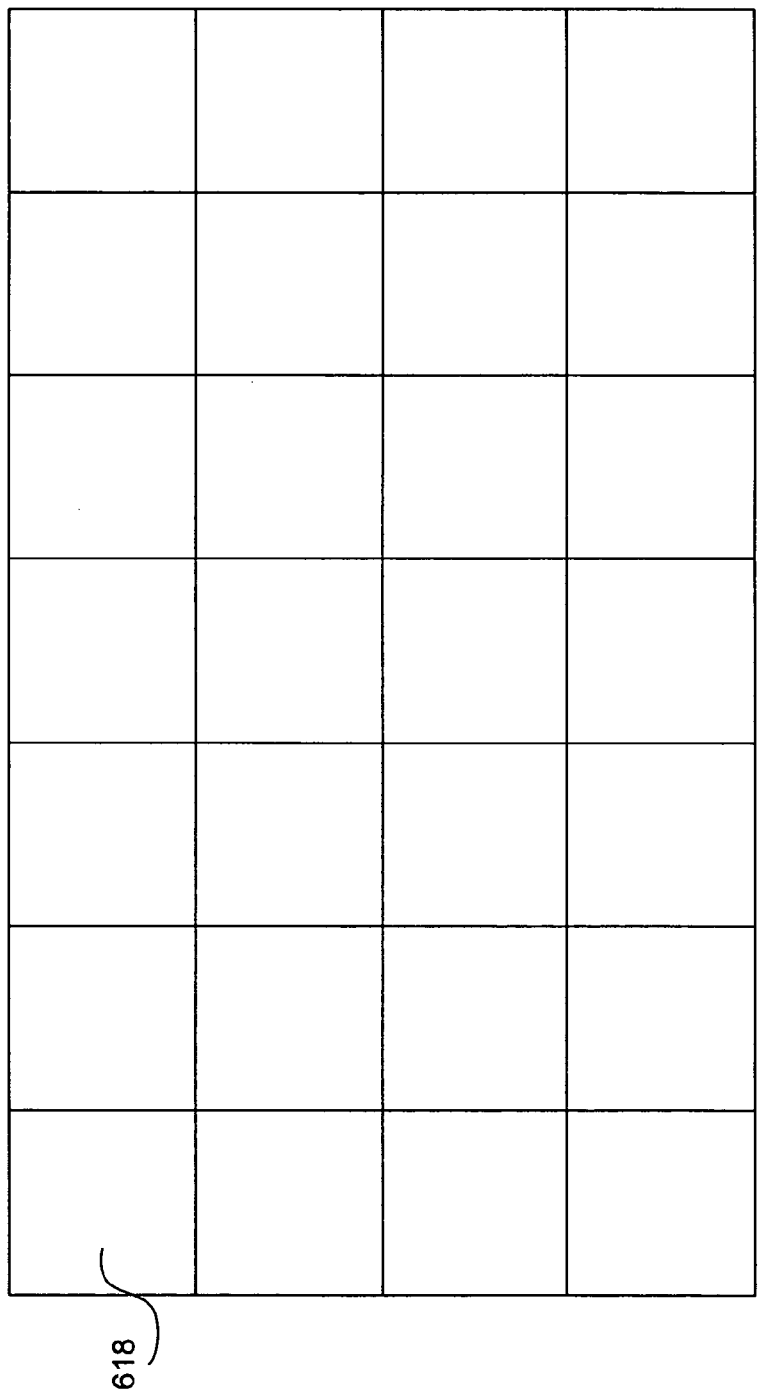
FIG. 6 is a diagram illustrating a composite image, in accordance with one embodiment of the present invention.

Referring now to FIG. 6, a diagram illustrating a composite image 616 shown, in accordance with one embodiment of the present invention. The FIG. 6 embodiment is presented for purposes of illustration, and in alternate embodiments, the present invention may readily include techniques and elements, in addition to, or instead of, certain of those techniques and elements discussed in conjunction with the FIG. 6 embodiment.

In the FIG. 6 embodiment, a group of sample images 618 with homogenous texture characteristics may be selected and merged to create composite image 616. Sample images 618 are typically selected as a model to represent a particular image search object or category. For example, sample images 618 may be selected because they all are images of a similar or related subject matter. In the FIG. 6 embodiment, feature detector 218 or other appropriate entity may then utilize composite image 616 to create a texture model by calculating composite wavelet coefficients 312 (FIG. 3) for the entire composite image 616, as discussed above in conjunction with FIG. 4.

In the FIG. 6 embodiment, feature detector 218 or other appropriate entity may utilize the composite wavelet coefficients 312 to calculate various image parameters as discussed above in conjunction with FIG. 5. Feature detector 218 or other appropriate entity may then utilize the foregoing composite image parameters to calculate distance values 328 (FIG. 3) that quantify texture similarity characteristics between the texture model and various test images from image data 216 (FIG. 2).

For example, in the FIG. 6 embodiment, feature detector 218 or other appropriate entity may calculate a distance value 328 for a texture model and a given test image according to the following formula:

$$D = \sum_{i=1}^{4} \frac{1}{2^i} \left[ \mu_{(i)}^T |\theta_{\mu_{(i)}}^T - \theta_{\mu_{(i)}}^I| + \frac{1}{5} \sigma_{(i)}^T |\theta_{\sigma_{(i)}}^T - \theta_{\sigma_{(i)}}^I| \right]$$

where D is a distance value 328, T indicates the texture model, I indicates the test image, i is a wavelet level, $\mu$ is a total mean absolute value, $\sigma$ is a total variance value, $\theta_\sigma$ is a variance value texture angle, and $\theta_\mu$ is a mean absolute value texture angle. In certain embodiments, the foregoing formula may be similarly utilized to calculate distance values 328 for any other type of query image for performing image search or retrieval procedures, in accordance with the present invention.

The purpose for creating composite images 616 is to provide corresponding texture models. Collections of sample images 618 with similar texture are chosen and merged. Texture parameters may then be determined for composite images 616 to describe the respective textures of the composite images 616. A system user may then chose an appropriate texture model 616 to search for test images with those particular corresponding texture characteristics.

Figure 7:
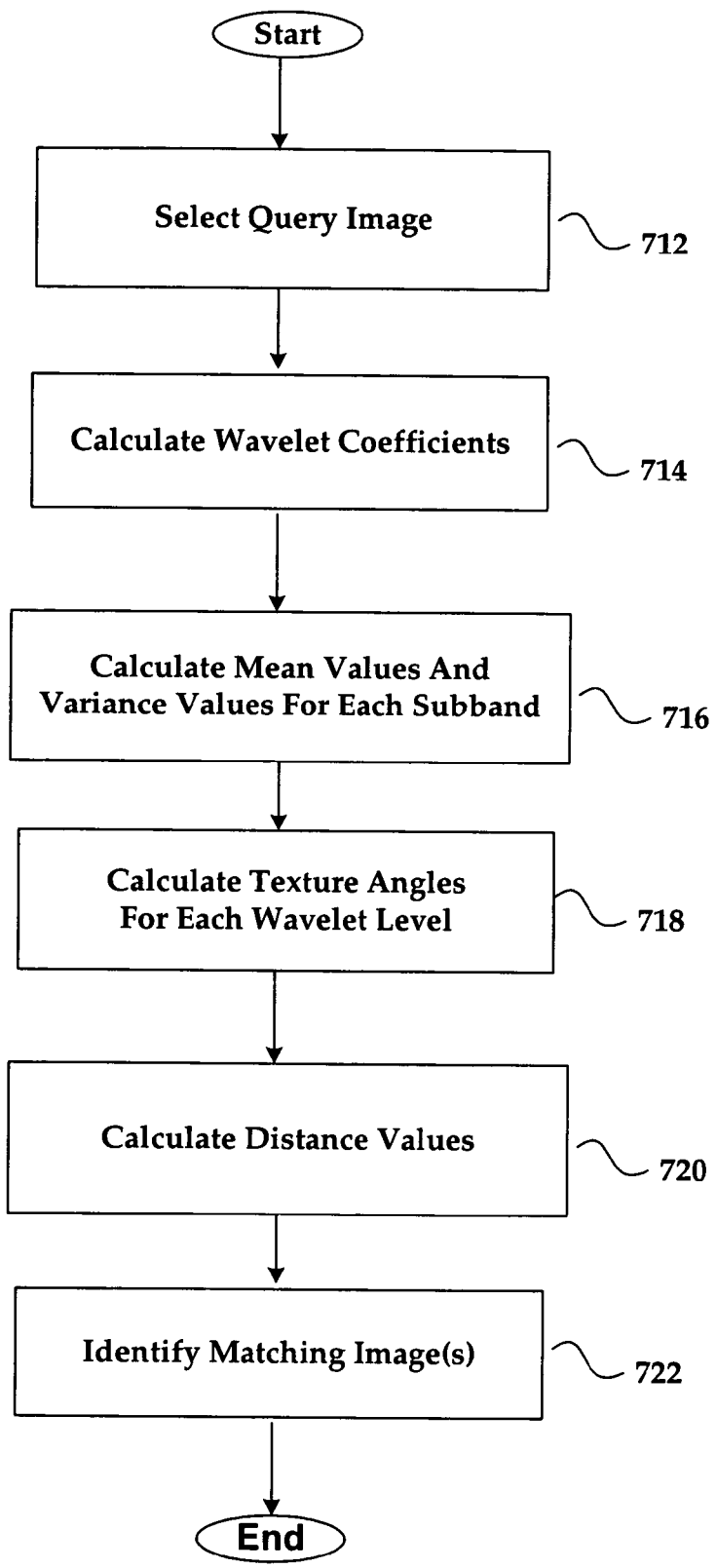
FIG. 7 is a flowchart of method steps for performing a basic image retrieval procedure, in accordance with one embodiment of the present invention.

Referring now to FIG. 7, a flowchart of method steps for performing a basic image retrieval procedure is shown, in accordance with one embodiment of the present invention. The FIG. 7 example is presented for purposes of illustration, and, in alternate embodiments, the present invention may readily utilize steps and sequences other than certain of those steps and sequences discussed in conjunction with the FIG. 7 embodiment.

In the FIG. 7 embodiment, in step 712, computer device 110 or another appropriate entity selects a query image for performing the image retrieval procedure to identify matching test images from image data 216. Then, in step 714, feature detector 218 or another appropriate entity calculates wavelet coefficients 312 corresponding to a four-level Haar wavelet transform of the query image, as discussed above in conjunction with FIGS. 4-6.

In step 716, feature detector 218 or another appropriate entity calculates mean absolute values 316 and variance values 320 for each subband of the four-level wavelet transform, based upon the foregoing wavelet coefficients 312. In step 718, feature detector 218 or another appropriate entity utilizes the foregoing mean absolute values 316 and variance values 320 to calculate texture angles 324 for each wavelet level of the wavelet transform.

In step 720, feature detector 218 or another appropriate entity utilizes the foregoing texture angles 324, mean absolute values 316, and variance values 320 to calculate distance values 328 that represent texture similarity characteristics between the query image and various test images from image data 216. Finally, in step 722, feature detector 218 or another appropriate entity evaluates the distance values 328 to identify one or more matching images from among the test images.

The FIG. 7 flowchart describes a process for evaluating images with relatively homogeneous texture characteristics. However, the foregoing process may also be utilized to evaluate images with texture characteristics that are inhomogeneous. In certain embodiments, an inhomogeneous image may be divided into smaller pixel blocks. For example, an inhomogeneous image may be divided into blocks of 32 pixels by 32 pixels, or into any other effective block size. Each pixel block may then be treated as an individual image according to the procedure described above in FIG. 7. An average distance value for all the pixel blocks may then be utilized as a total distance value for the inhomogeneous image for purposes of performing image retrieval procedures.

Figure 8:
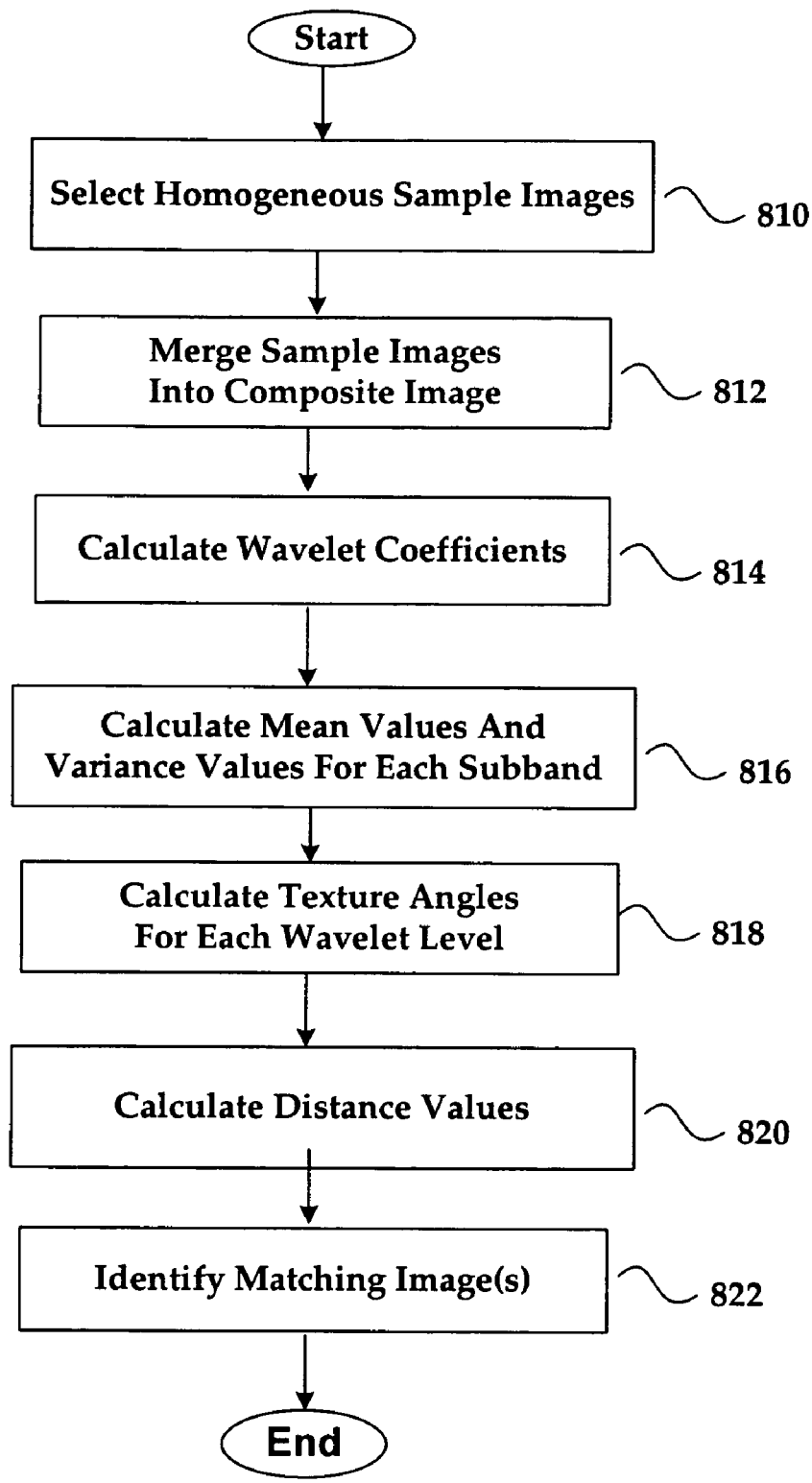
FIG. 8 is a flowchart of method steps for performing a texture model based image retrieval procedure, in accordance with one embodiment of the present invention.

Referring now to FIG. 8, a flowchart of method steps for performing a model image retrieval procedure is shown, in accordance with one embodiment of the present invention. The FIG. 8 example is presented for purposes of illustration, and, in alternate embodiments, the present invention may readily utilize steps and sequences other than certain of those discussed in conjunction with the FIG. 8 embodiment.

In the FIG. 8 embodiment, in step 810, computer device 110 or another appropriate entity selects homogeneous sample images 618 to create a texture model for performing image retrieval procedures upon one or more matching test images from image data 216. Then, in step 812, computer device 110 or another appropriate entity merges the sample images 618 into a composite image 616.

In step 814, feature detector 218 or another appropriate entity calculates wavelet coefficients 312 corresponding to a four-level Haar wavelet transform of composite image 616, as discussed above in conjunction with FIG. 6. In step 816, feature detector 218 or another appropriate entity calculates mean absolute values 316 and variance values 320 for each subband of the four-level wavelet transform, based upon the foregoing wavelet coefficients 312. In step 818, feature detector 218 or another appropriate entity utilizes the foregoing mean absolute values 316 and variance values 320 to calculate texture angles 324 for each wavelet level of the wavelet transform.

In step 820, feature detector 218 or another appropriate entity utilizes the foregoing texture angles 324, mean absolute values 316, and variance values 320 to calculate distance values 328 that represent texture similarity characteristics between the composite image and various test images from image data 216. Finally, in step 822, feature detector 218 or another appropriate entity evaluates the distance values 328 to identify one or more matching images from among the test images.

Figure 9:
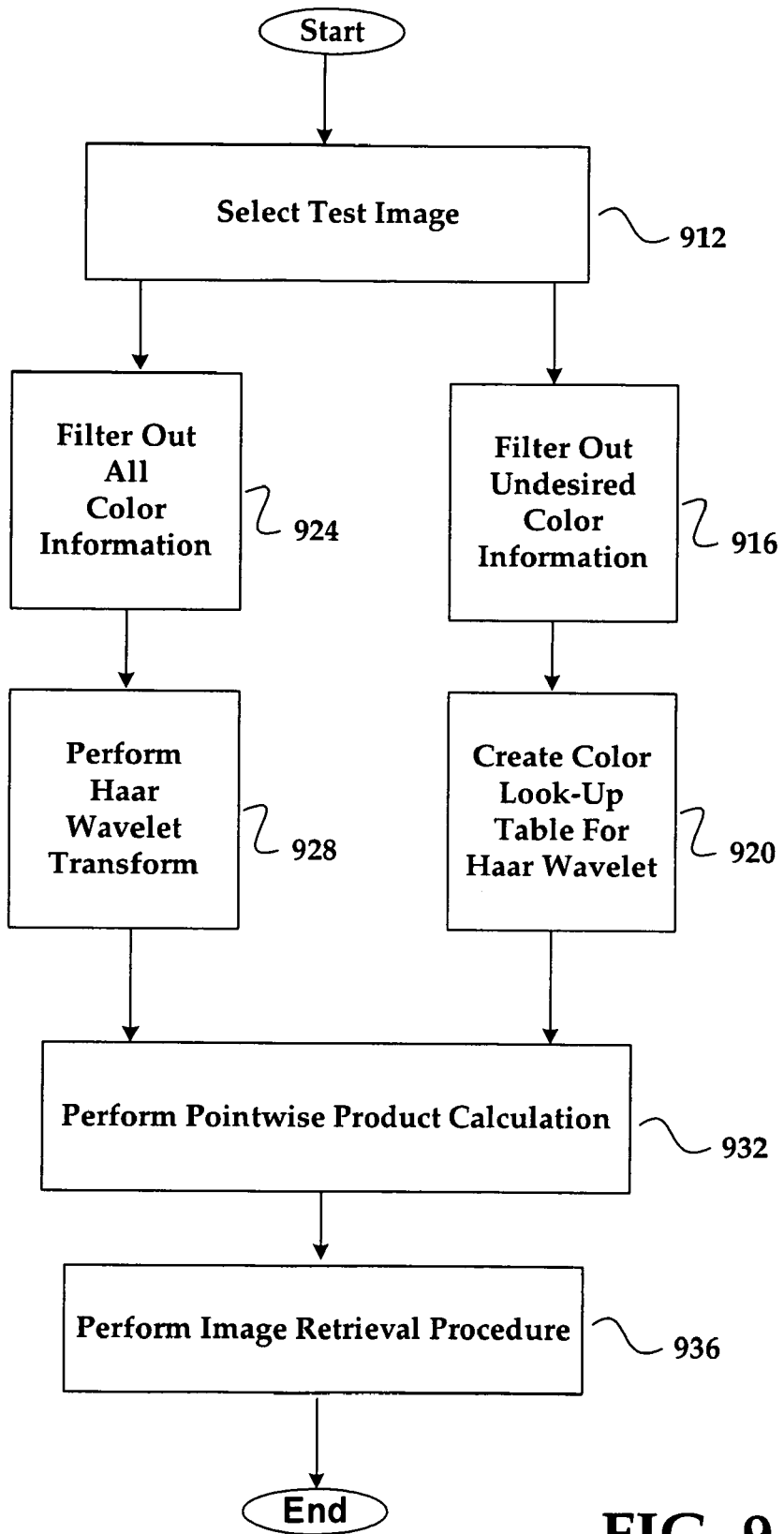
FIG. 9 is a flowchart of method steps for performing a texture/color model based image retrieval procedure, in accordance with one embodiment of the present invention.

Referring now to FIG. 9, a flowchart of method steps for performing a texture/color image retrieval procedure is shown, in accordance with one embodiment of the present invention. The FIG. 9 example is presented for purposes of illustration, and, in alternate embodiments, the present invention may readily utilize steps and sequences other than certain of those discussed in conjunction with the FIG. 9 embodiment.

In the FIG. 9 embodiment, in step 912, computer device 110 or another appropriate entity selects a test image for performing the image retrieval procedure to identify one or more matching images from image data 216. This test image is for determining whether it is a matching image, and is not a query image. In step 916, feature detector 218 or another appropriate entity utilizes a color model to filter out undesired color information from the test image to thereby produce a filtered image. In step 920, feature detector 218 or another appropriate entity creates a color look-up table for a Haar wavelet by converting the filtered image into the wavelet domain as a four-level filtered wavelet transform populated with filtered color coefficients.

In step 924, feature detector 218 or another appropriate entity filters out all color information from the selected test image to produce a luminance image. Then in step 928, feature detector 218 or another appropriate entity performs a four-level Haar wavelet transform procedure upon the luminance image to create wavelet coefficients 312, as discussed above in conjunction with FIGS. 4-5.

In step 932, feature detector 218 or another appropriate entity performs a pointwise product calculation by multiplying each of the wavelet coefficients 312 from the Haar wavelet transform with a corresponding one of the filtered color coefficients from the four-level filtered wavelet transform to produce a texture/color image model. Finally, in step 936 (as discussed above in conjunction with steps 820-822 of FIG. 8), the texture/color image model may be utilized for performing various image retrieval procedures as discussed above in conjunction with FIG. 7.

In the FIG. 9 embodiment, texture/color model based image retrieval procedures may be performed with texture angles 324, total mean absolute values 316, and total variance values 320 that are calculated using techniques and formulas similar to those discussed above in conjunction with FIGS. 5-6.

However, in certain embodiments, feature detector 218 (FIG. 2) or other appropriate entity may calculate a coefficient mean absolute value $\mu$ for a given subband LH by utilizing the following formula:

$$\mu_{LH(i)} = \frac{\sum_{m=1}^{M}\sum_{n=1}^{N} |C_{LH(i)}[m,n] W_{LH(i)}[m,n]|}{\sum_{m=1}^{M}\sum_{n=1}^{N} C_{LH(i)}[m,n]}$$

where LH(i) is an LH subband at level i, W is a wavelet coefficient, C is a filtered color coefficient, m is a coefficient row, n is a coefficient column, M is equal to a total number of coefficient rows, and N is equal to a total number of coefficient columns. Coefficient mean absolute values 316 for other subbands may be calculated in a similar manner.

In addition, in certain embodiments, feature detector 218 or other appropriate entity may calculate a coefficient variance value $\sigma$ for a given subband LH by utilizing the following formula:

$$\sigma^2_{LH(i)} = \frac{\sum_{m=1}^{M}\sum_{n=1}^{N} (|C_{LH(i)}[m,n] W_{LH(i)}[m,n]| - \mu_{LH(i)})^2}{\sum_{m=1}^{M}\sum_{n=1}^{N} C_{LH(i)}[m,n]}$$

where LH(i) is an LH subband at level i, W is a wavelet coefficient, C is a filtered color coefficient, m is a coefficient row, n is a coefficient column, M is equal to total number of coefficient rows, N is equal to total number of coefficient columns, and $\mu$ is a corresponding coefficient mean absolute value 316. Coefficient variance values 320 for other subbands may be calculated in a similar manner.

For all of the foregoing reasons, the present invention therefore provides an improved system and method for performing wavelet-based texture feature extraction and classification procedures.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image search procedure with an electronic device, comprising:
   image data stored in a memory device that is accessible to said electronic device, said image data including a query image and test images; and
   a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, said image parameters including coefficient mean absolute values for each of said subbands, a coefficient mean absolute value $\mu$ for a subband LH being calculated utilizing a formula:

$$\mu_{LH(i)} = \frac{1}{MN}\sum_{m=1}^{M}\sum_{n=1}^{N}|W_{LH(i)}[m,n]|$$

where LH(i) is said subband LH at a level i, W is a wavelet coefficient, m is a coefficient row, n is a coefficient column, M is equal to a total number of coefficient rows, and N is equal to a total number of coefficient columns.

2. A system for performing an image search procedure with an electronic device, comprising:

image data stored in a memory device that is accessible to said electronic device, said image data including a query image and test images; and a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, said image parameters including coefficient variance values for each of said subbands, a coefficient variance value σ for a subband LH being calculated by utilizing a formula:

$$\sigma^2_{LH(i)} = \frac{1}{MN}\sum_{m=1}^{M}\sum_{n=1}^{N}(|W_{LH(i)}[m,n]| - \mu_{LH(i)})^2$$

where LH(i) is an LH subband at level i, W is a wavelet coefficient, m is a coefficient row, n is a coefficient column, M is equal to a total number of coefficient rows, N is equal to a total number of coefficient columns, and μ is a corresponding coefficient mean absolute value.

3. A system for performing an image search procedure with an electronic device, comprising:

image data stored in a memory device that is accessible to said electronic device, said image data including a query image and test images; and a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, said image parameters including a mean absolute value texture angle and a variance value texture angle, said mean absolute value texture angle being calculated according to a formula:

$$\theta_{\mu(i)} = \arctan\frac{\mu_{LH(i)}}{\mu_{HL(i)}}$$

where $\theta_{\mu(i)}$ is said mean absolute value texture angle, μ is a coefficient mean absolute value, i is a subband level, LH is a Low-High subband, and HL is a High-Low subband.

4. A system for performing an image search procedure with an electronic device, comprising:

image data stored in a memory device that is accessible to said electronic device, said image data including a query image and test images; and a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, said image parameters include a mean absolute value texture angle and a variance value texture angle, said variance value texture angle being calculated according to a formula:

$$\theta_{\sigma(i)} = \arctan\frac{\sigma_{LH(i)}}{\sigma_{HL(i)}}$$

where $\theta_{\sigma(i)}$ is said variance value texture angle, σ is a coefficient variance value, i is a subband level, LH is a Low-High subband, and HL is a High-Low subband.

5. A system for performing an image search procedure with an electronic device, comprising:

image data stored in a memory device that is accessible to said electronic device, said image data including a query image and test images; and a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, said image parameters including total mean absolute values that are calculated according to a formula:

$$\mu_{(i)} = [\mu_{LH(i)}^2 + \mu_{HH(i)}^2 + \mu_{HL(i)}^2]^{1/2}$$

where $\mu_{(i)}$ is one of said total mean absolute values, i is a wavelet level, $\mu_{LH(i)}$ is a first coefficient mean absolute value for an LH subband, $\mu_{HH(i)}$ is a second coefficient mean absolute value for an HH subband, and $\mu_{HL(i)}$ is a third coefficient mean absolute value for an HL subband.

6. A system for performing an image search procedure with an electronic device, comprising:

image data stored in a memory device that is accessible to said electronic device, said image data including a query image and test images; and a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, said image parameters including total variance values that are calculated according to a formula:

$$\sigma_{(i)}^2 = \sigma_{LH(i)}^2 + \sigma_{HH(i)}^2 + \sigma_{HL(i)}^2$$

where $\sigma_{(i)}$ is one of said total variance values, i is a wavelet level, $\sigma_{LH(i)}$ is a first coefficient variance value for an LH subband, $\sigma_{HH(i)}$ is a second coefficient variance value for an HH subband, and $\sigma_{HL(i)}$ is a third coefficient variance value for an HL subband.

7. A system for performing an image search procedure with an electronic device, comprising:

image data stored in a memory device that is accessible to said electronic device, said image data including a query image and test images, said query image being a texture model of a composite image that is formed by merging a series of homogeneous sample images; and a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, one of said distance values for said texture model and one of said test images being calculated according to a formula:

$$D = \sum_{i=1}^{4} \frac{1}{2^i}\left[\mu_{(i)}^T |\theta_{\mu_{(i)}}^T - \theta_{\mu_{(i)}}^I| + \frac{1}{5}\sigma_{(i)}^T|\theta_{\sigma_{(i)}}^T - \theta_{\sigma_{(i)}}^I|\right]$$

where D is said one of said distance values, T indicates said texture model,

I indicates said one of said test images, i is a wavelet level, $\mu$ is a total mean absolute value, $\sigma$ is a total variance value, $\theta_\sigma$ is a variance value texture angle, and $\theta_\mu$ is a mean absolute value texture angle.

8. A system for performing an image search procedure with an electronic device, comprising:

image data stored in a memory device that is accessible to said electronic device, said image data including a query image and test images; and a feature detector that calculates image parameters corresponding to said image data, said feature detector utilizing said image parameters to calculate distance values that represent texture similarity characteristics between said query image and said test images, said feature detector evaluating said distance values to determine a matching image from among said test images, said feature detector performing a texture/color model based retrieval procedure by initially filtering out all undesired color information from said query image to produce a filtered color image, said feature detector then converting said filtered color image into a four-level wavelet transform with color coefficients, said feature detector also filtering out all color information from said query image to produce a luminance image, said feature detector then creating a four-level Haar wavelet transform from said luminance image to produce wavelet coefficients.

9. The system of claim 8 wherein said feature detector performs a pointwise product procedure to produce a composite texture/color model for performing said texture/color model based retrieval procedure, said pointwise product procedure being performed by multiplying each of said color coefficients with corresponding ones of said wavelet coefficients to produce composite texture/color coefficients.

10. The system of claim 9 wherein said texture/color retrieval procedure includes calculating a coefficient mean absolute value $\mu$ for a subband LH by utilizing a formula:

$$\mu_{L,H(i)} = \frac{\sum_{m=1}^{M}\sum_{n=1}^{N} |C_{LH(i)}[m,n]W_{LH(i)}[m,n]|}{\sum_{m=1}^{M}\sum_{n=1}^{N} C_{LH(i)}[m,n]}$$

where LH(i) is said subband LH at level i, W is a wavelet coefficient, C is a filtered color coefficient, m is a coefficient row, n is a coefficient column, M is equal to a total number of coefficient rows, and N is equal to a total number of coefficient columns.

11. The system of claim 9 wherein said texture/color retrieval procedure includes calculating a coefficient variance value $\sigma$ for a subband LH by utilizing a formula:

$$\sigma_{LH(i)}^2 = \frac{\sum_{m=1}^{M}\sum_{n=1}^{N} (|C_{LH(i)}[m,n]W_{LH(i)}[m,n]| - \mu_{LH(i)})^2}{\sum_{m=1}^{M}\sum_{n=1}^{N} C_{LH(i)}[m,n]}$$

where LH(i) is said subband LH at level i, W is a wavelet coefficient, C is a filtered color coefficient, m is a coefficient row, n is a coefficient column, M is equal to total number of coefficient rows, N is equal to total number of coefficient columns, and $\mu$ is a corresponding coefficient mean absolute value.

* * * * *